United States Patent
Ueda et al.

(10) Patent No.: US 7,463,274 B2
(45) Date of Patent: Dec. 9, 2008

(54) IMAGE PRINTING APPARATUS, IMAGE PRINTING METHOD, PROGRAM FOR AN IMAGE PRINTING METHOD AND RECORDING MEDIUM HAVING PROGRAM OF IMAGE PRINTING METHOD RECORDED THEREON

(75) Inventors: Michitada Ueda, Kanagawa (JP); Atsushi Nakayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 196 days.

(21) Appl. No.: 11/536,728

(22) Filed: Sep. 29, 2006

(65) Prior Publication Data
US 2007/0076178 A1   Apr. 5, 2007

(30) Foreign Application Priority Data
Oct. 3, 2005 (JP) .............................. 2005-289737

(51) Int. Cl.
*B41J 2/315* (2006.01)
(52) U.S. Cl. ...................................... 347/171
(58) Field of Classification Search ................ 347/171, 347/172, 173, 176, 215, 222; 400/120.02, 400/120.04
See application file for complete search history.

(56) References Cited
FOREIGN PATENT DOCUMENTS

| JP | 09-109506 | 4/1997 |
|---|---|---|
| JP | 11-234506 | 8/1999 |
| JP | 11-321010 | 11/1999 |
| JP | 2002-354229 | 12/2002 |
| JP | 2003-532205 | 10/2003 |
| JP | 2004-114464 | 4/2004 |
| JP | 2004-268353 | 9/2004 |
| JP | 2005-012764 | 1/2005 |
| JP | 2005-266359 | 9/2005 |

*Primary Examiner*—K. Feggins
(74) *Attorney, Agent, or Firm*—Sonnenschein Nath & Rosenthal LLP

(57) ABSTRACT

This invention provides an image printing apparatus, an image printing method, a program for an image printing method and a program having a program for an image printing method recorded thereon wherein disagreement in size between a scale and a photograph in scrap booking can be eliminated simply and with certainty. An image printing apparatus for printing an image to be used for scrap booking, comprising an image data acquisition section, a template retaining section, a template selection section, an image display section, an operation section and a printing section. Also it is demanded to provide an image printing apparatus, an image printing method, a program for an image printing method and a program having a program for an image printing method recorded thereon wherein otherwise possible deterioration of the finish arising from a line for cutting can be prevented.

5 Claims, 9 Drawing Sheets

IMAGE PRINTING APPARATUS, IMAGE PRINTING METHOD, PROGRAM FOR AN IMAGE PRINTING METHOD AND RECORDING MEDIUM HAVING PROGRAM OF IMAGE PRINTING METHOD RECORDED THEREON

CROSS REFERENCES TO RELATED APPLICATIONS

The present application contains subject matter related to Japanese Patent Application JP 2005-289737 filed with the Japanese Patent Office on Oct. 3, 2005, the entire contents of which being incorporated herein by reference.

BACKGROUND OF THE INVENTION

1. Field of the Invention

This invention relates to an image printing apparatus, an image printing method, a program for an image printing method and a program having a program for an image printing method recorded thereon.

2. Description of the Related Art

In cent years, scrap booking of producing a scrap book has been and is being spread widely. The scrap booking is one of papercraft hobbies. According to the scrap booking, a photograph is cut out in a desired shape and is pasted to a board with various decorations applied thereto to produce an original scrap book.

Thus, various boards for a scrap book, various decorating items for decorations, scales for cutting out a photograph, scissors for use for cutting and so forth are provided to users of such scrap booking. Consequently, in scrap booking, a scale used in cutting a photograph can be placed on a photograph to draw a line for cutting, and the photograph can be cut out along the line for cutting using scissors. Therefore, the photograph can be cut out in a desired one of various shapes such as a star shape, a heart shape or a diamond shape in accordance with the shape of the scale and pasted to a board.

In regard to such various processes relating to a photograph as described above, a method is disclosed in Japanese Patent Laid-Open No. 2004-114464 wherein an image is printed directly on album paper in accordance with a layout desired by a user. Another method is disclosed in JP-A-2003-532205 wherein each image is printed with a format thereof set so as to correspond to the layout in which the image is to be pasted to an album. A further method is disclosed in Japanese Patent Laid-Open No. 2004-268353 wherein a region designated by a user is printed selectively. A still further method is disclosed in Japanese Patent Laid-Open No. Hei 11-321010 wherein register marks with which a photograph is to be cut appropriately are printed together with an image.

Incidentally, in scrap booking, when it is tried to use a scale to cut out a photograph, the image pickup subject image on the photograph may be smaller than the scale or conversely may be greater than the scale. In such an instance, the user may want to have the size of the photograph adjusted to the size of the scale or conversely may want to have the size of the scale adjusted to the size of the photograph. Or the user may want to change the size of both of the scale and the photograph. Therefore, if such disagreement in size between the scale and the photograph can be eliminated simply and with certainty, then it is considered possible to produce a scrap book simply and readily in an intended design and hence enhance the pleasure in scrap booking significantly.

Meanwhile, where a line for cutting is drawn using a scale to cut out a photograph, if sufficient care is not taken to cut the photograph, then the line for cutting may remain on the photograph and deteriorate the finish of the scrap book. Therefore, if a photograph can be cut out simply such that no such line for cutting may remain thereon, then it is considered possible to enhance the finish of the scrap book significantly and hence enhance the pleasure in scrap booking further significantly.

In such cases as described above, the method of, for example, Japanese Patent Laid-Open No. 2004-114464 or JP-A-2003-532205 may be applied to print a photograph. However, the methods disclosed in the documents deteriorate the pleasure in preparation of a scrap book through cutting out of a photograph by manual operation. Although also it seems advisable to apply the method disclosed in Japanese Patent Laid-Open No. 2004-268353 or Japanese Patent Laid-Open No. Hei 11-321010, the methods are disadvantageous in that they cannot be applied practically to cutting out of a photograph in a complicated and diverse shape as in scrap booking.

SUMMARY OF THE INVENTION

Therefore, it is demanded to provide an image printing apparatus, an image printing method, a program for an image printing method and a program having a program for an image printing method recorded thereon wherein disagreement in size between a scale and a photograph in scrap booking can be eliminated simply and with certainty.

Also it is demanded to provide an image printing apparatus, an image printing method, a program for an image printing method and a program having a program for an image printing method recorded thereon wherein otherwise possible deterioration of the finish arising from a line for cutting can be prevented.

According to the present invention, a template selected by a user is displayed in an overlapping relationship with an image of a processing object, and a change of the relative position between the displayed image and the template and a change of the size of the image or the template are accepted. Then, based on the settings of the image and the template, the image and the template are printed on the front face and the rear face of paper, respectively.

In particular, according to a preferred embodiment of the present invention, there is provided an image printing apparatus for printing an image to be used for scrap booking, including an image data acquisition section configured to acquire image data of a processing object image, a template retaining section configured to retain a plurality of templates each indicating a contour line of a cutout shape in which the image for the scrap booking is to be cut out, a template selection section configured to select at least one of the templates retained by the retaining section, an image display section configured to display an image based on the image data acquired by the image data acquisition step and the template selected by the template selection section such that the template is disposed on the image, an operation section configured to be operated by a user to change the relative position of the image and the template displayed on the image display section and change the size of the image and/or the template displayed on the image display section, and a printing section configured to print the image and the template on the front and rear faces of paper, respectively, such that, where the paper is viewed from the front face side on which the image is printed under the assumption that the paper is transparent, the image and the template may coincide with the display of the image and template by the image display section changed by the operation section.

With the image printing apparatus, by a change of the relative position of the image and the template displayed on the image display section by the operation section and a change of the size of the image and/or the template, disagreement in size between a scale and a photograph can be eliminated simply and with certainty. Further, the image printing apparatus includes the printing section configured to print the image and the template on the front and rear faces of paper, respectively, such that, where the paper is viewed from the front face side on which the image is printed under the assumption that the paper is transparent, the image and the template may coincide with the display of the image and template by the image display section changed by the operation section. Therefore, a result of the printing can be cut along the line for cutting printed on the rear face of the paper to cut a photograph in a shape set by the template. Meanwhile, even if the line for cutting remains on the photograph, it can be prevented from being observed from the front face side of the paper. Consequently, where the photograph is applied to scrap booking, disagreement in size between a scale and the photograph can be eliminated simply and with certainty, and otherwise possible deterioration of the finish caused by a line for cutting can be prevented.

According to another embodiment of the present invention, there is provided an image printing method for printing an image to be used for scrap booking, including an image data acquisition step of acquiring image data of a processing object image, a template selection step of selecting, from a template retaining section which retains a plurality of templates each indicating a contour line of a cutout shape in which the image for the scrap booking is to be cut out, at least one of the templates, an image display step of displaying an image based on the image data acquired by the image data acquisition step and the template selected by the template selection step such that the template is disposed on the image, an operation step of being operated by a user to change the relative position of the image and the template displayed by the image display step and change the size of the image and/or the template displayed by the image display step, and a printing step of printing the image and the template on the front and rear faces of paper, respectively, such that, where the paper is viewed from the front face side on which the image is printed under the assumption that the paper is transparent, the image and the template may coincide with the display of the image and template by the image display step changed by the operation step.

According to a further embodiment of the present invention, there is provided a program for an image printing method for printing an image to be used for scrap booking by execution of an arithmetic operation processing section, including an image data acquisition step of acquiring image data of a processing object image, a template selection step of selecting, from a template retaining section which retains a plurality of templates each indicating a contour line of a cutout shape in which the image for the scrap booking is to be cut out, at least one of the templates, an image display step of displaying an image based on the image data acquired by the image data acquisition step and the template selected by the template selection step such that the template is disposed on the image, an operation step of being operated by a user to change the relative position of the image and the template displayed by the image display step and change the size of the image and/or the template displayed by the image display step, and a printing step of printing the image and the template on the front and rear faces of paper, respectively, such that, where the paper is viewed from the front face side on which the image is printed under the assumption that the paper is transparent, the image and the template may coincide with the display of the image and template by the image display step changed by the operation step.

According to a still further embodiment of the present invention, there is provided a recording medium on which a program for an image printing method for printing an image to be used for scrap booking by execution of an arithmetic operation processing section is recorded, the program for an image printing method including an image data acquisition step of acquiring image data of a processing object image, a template selection step of selecting, from a template retaining section which retains a plurality of templates each indicating a contour line of a cutout shape in which the image for the scrap booking is to be cut out, at least one of the templates, an image display step of displaying an image based on the image data acquired by the image data acquisition step and the template selected by the template selection step such that the template is disposed on the image, an operation step of being operated by a user to change the relative position of the image and the template displayed by the image display step and change the size of the image and/or the template displayed by the image display step, and a printing step of printing the image and the template on the front and rear faces of paper, respectively, such that, where the paper is viewed from the front face side on which the image is printed under the assumption that the paper is transparent, the image and the template may coincide with the display of the image and template by the image display step changed by the operation step.

With the image printing method and with the image printing method of the program as well as the image printing method recorded on the recording medium, where an image obtained by the image printing methods is applied to scrap booking, disagreement in size between a scale and a photograph can be eliminated simply and with certainty, and otherwise possible deterioration of the finish caused by the line for cutting can be prevented.

In summary, with the image printing apparatus and method and with the image printing method of the program as well as the image printing method recorded on the recording medium, where an image obtained by the image printing apparatus and methods is applied to scrap booking, disagreement in size between a scale and a photograph can be eliminated simply and with certainty, and otherwise possible deterioration of the finish caused by the line for cutting can be prevented.

The above and other features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

First Embodiment

1. Configuration of the Embodiment

Figure 2:
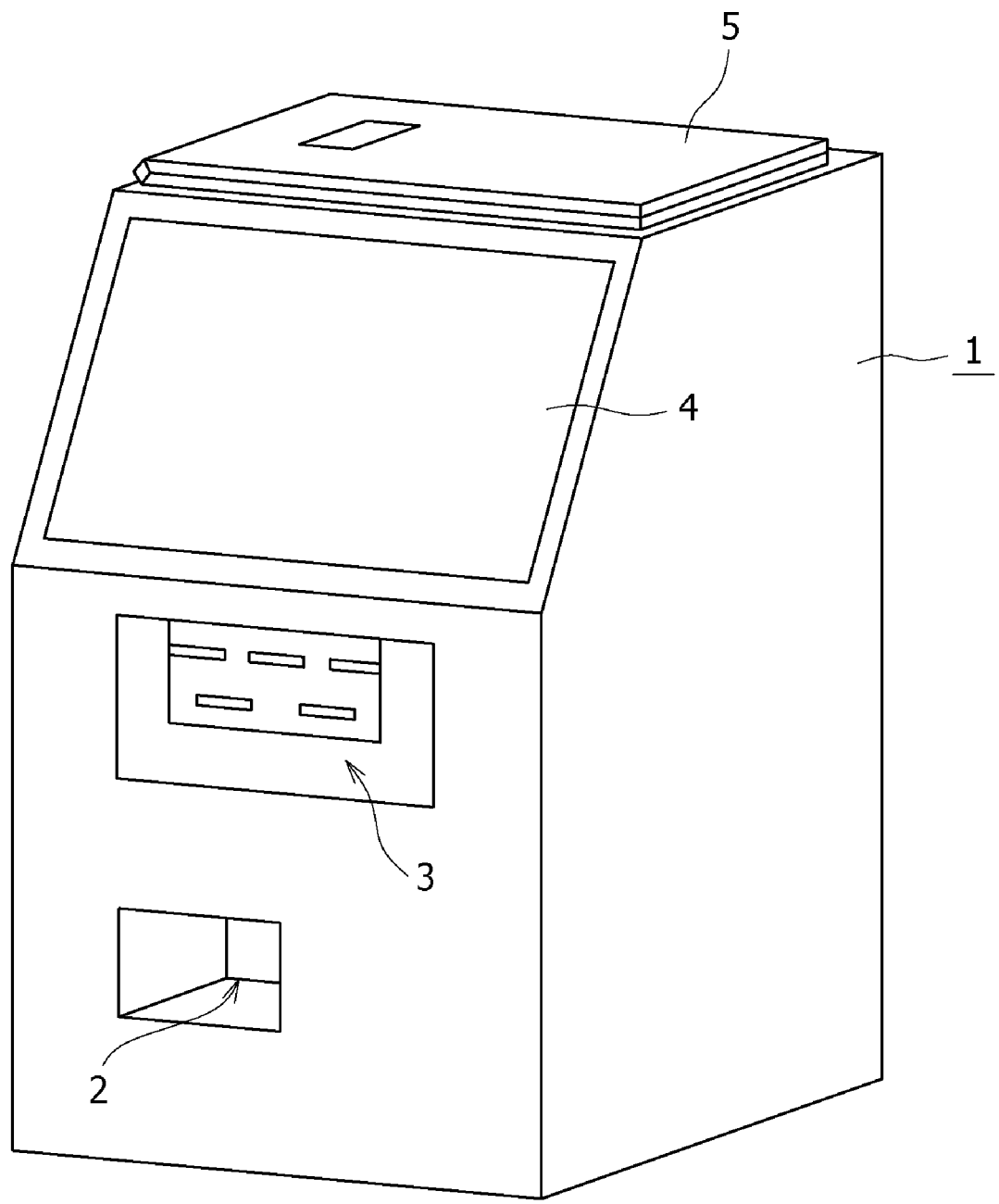
FIG. 2 is a perspective view showing the image printing apparatus.

FIG. 2 is a perspective view showing an image printing apparatus to which an embodiment of the present invention is applied. Referring to FIG. 2, the image printing apparatus 1 shown may be disposed in various shops and prints an image based on image data recorded on a recording medium such as a memory card on a photograph.

The image printing apparatus 1 has a generally parallelepiped shape elongated vertically and has a photograph outlet 2 provided on the front thereof such that a photograph as a result of printing can be taken out therefrom. Also inlet ports 3, a card inlet port into which a card for an accounting process is to be inserted and so forth are provided above the photograph outlet 2 on the front face of the image printing apparatus 1. The inlet ports 3 individually receive load various recording media such as a memory card, a magnetic disk, an optical disk and so forth loaded therein. An image display section 4 on which a touch panel is disposed above the inlet ports 3. An operation by a user is accepted by detecting selection of various menus displayed on the image display section 4 by means of the touch panel. Further, a flat head scanner 5 to be used for registration of a template is disposed on an upper end face of the image printing apparatus 1.

Figure 3:
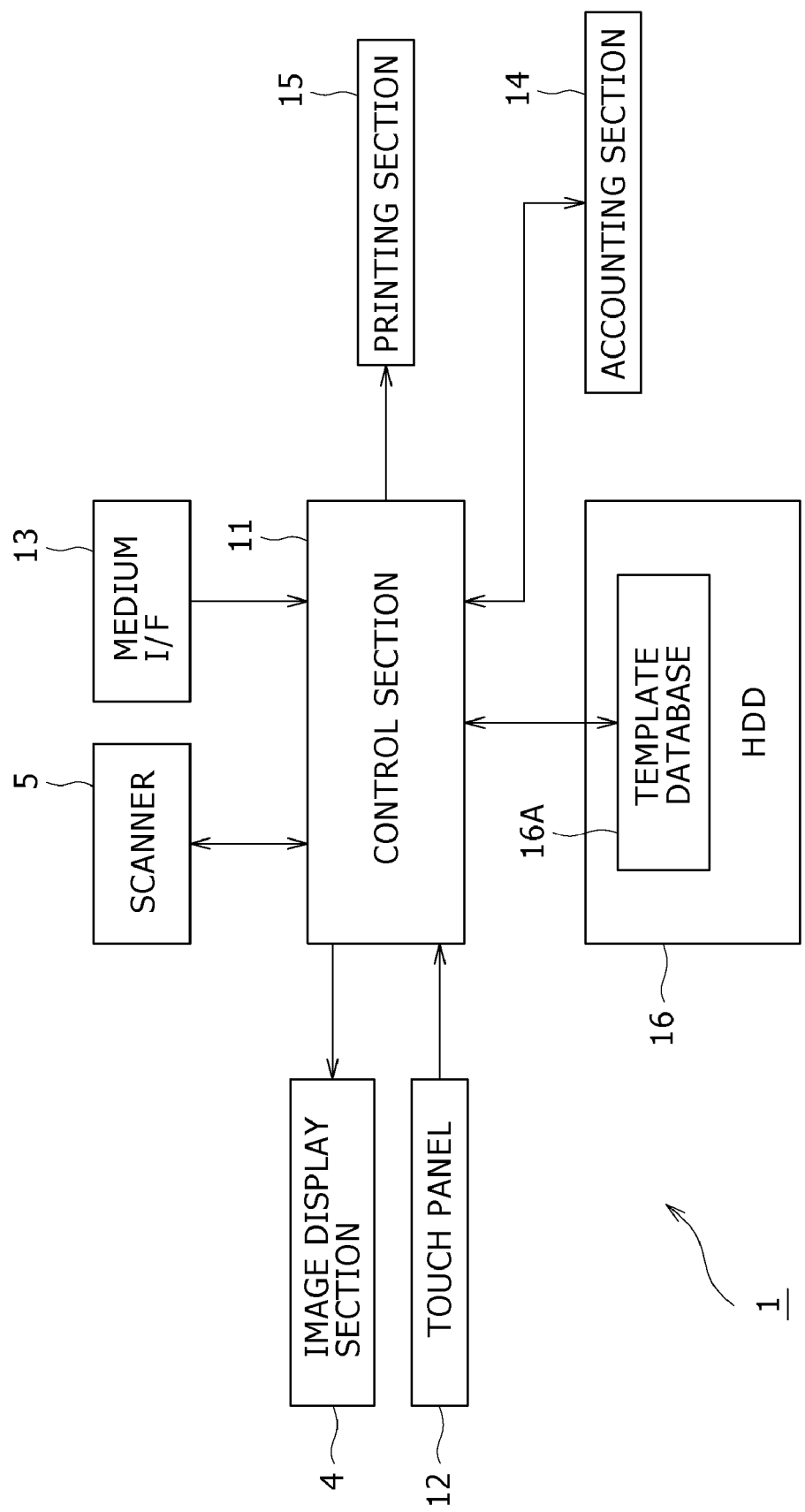
FIG. 3 is a block diagram of the image printing apparatus of FIG. 2.

FIG. 3 is a block diagram showing a configuration of the image printing apparatus 1. Referring to FIG. 3, the image printing apparatus 1 includes a image display section 4 which displays various images necessary for processing of the image printing apparatus 1 under the control of a control section 11. A touch panel 12 detects various operations by the user and notifies the control section 11 of the detected operations. A scanner 5 acquires various images on the object paper and notifies the control section 11 of the acquired image data. Meanwhile, a medium interface medium I/F 13 acquires image data and so forth from a recording medium inserted in any of the inlet ports 3 and notifies the control section 11 of the acquired image data and so forth. An accounting section 14 executes a series of processes relating to accounting.

A printing section 15 includes a printing mechanism which can perform double-sided printing. The printing section 15 prints an image and a template on the front and rear faces of predetermined paper and forwards a photograph of a result of printing to the photograph outlet 2. It is to be noted that a template here is an image indicating a cutout shape of an image for scrap booking in the form of a contour line of the cutout shape.

Figure 4:
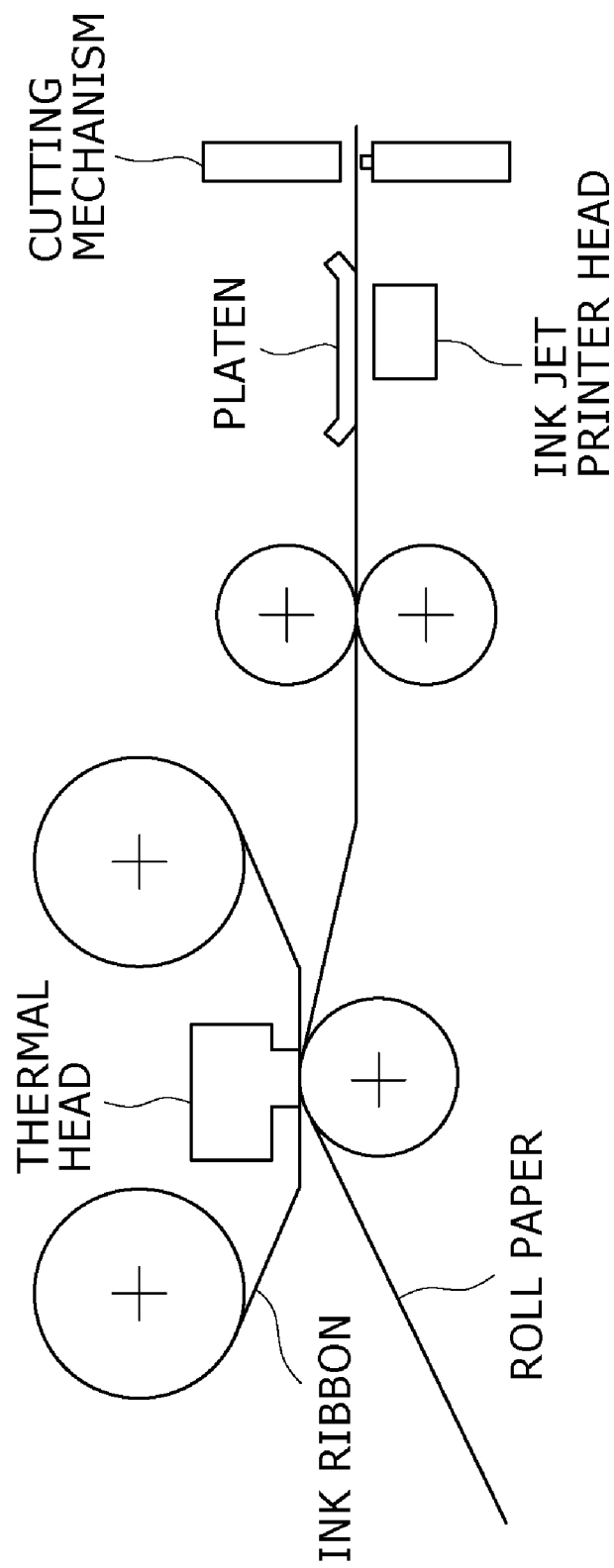
FIG. 4 is a schematic view showing a configuration of a printing section of the image printing apparatus of FIG. 2.

In particular, referring to FIG. 4, the printing section 15 holds roll paper for use with a printer of the sublimation type and presses an ink ribbon against the roll paper while feeding the roll paper. Further, a thermal head is driven to cause the ink of the ink ribbon to be transferred to the roll paper to print on the front face of the roll paper. Thus, the printing section 15 prints an image designated by a user on the front face of the roll paper to form a photograph.

The printing section 15 further includes an ink jet printer head disposed on the rear face side of the roll paper which is printed by the thermal head and fed. The ink jet printer head is driven to cause ink droplets to stick to the rear face of the roll paper to print on the rear face of the roll paper. Thus, the printing section 15 prints a template on the rear face of the roll paper. The printing section 15 further includes a cutting mechanism for cutting the roll paper having the rear face on which the template is printed by the ink jet printer head. The piece of the paper roll thus cut away is discharged to the photograph outlet 2.

Referring back to FIG. 3, a hard disk apparatus (HDD) 16 has recorded and retained thereon a processing program, various data and forth which relate to processing of the image printing apparatus 1. According to the image printing apparatus 1, a template database 16A is formed by recording of data by the hard disk apparatus 16. The template database 16A is a database of templates and is constructed by registration in advance and by additional registration through image reading using the scanner 5. It is to be noted that, in the present embodiment, templates of various shapes including square shapes, rectangular shapes, circular shapes, elliptical shapes elongated in various directions, various polygonal shapes, heart shapes and so forth are prepared. Meanwhile, the processing program recorded in the hard disk apparatus 16 are installed in advance in and provided together with the image printing apparatus 1. However, in place of such provision of the processing program by installation in advance as just described, the processing program may be recorded on and provided together with various recording media such as an optical disk, a memory card or a magnetic disk. Or alternatively, the processing program may be provided by downloading through a network such as the Internet.

The control section 11 is formed from an arithmetic operation processing section which controls operation of the entire image printing apparatus 1 and executes the processing program recorded in the hard disk apparatus 16 to control action of the components of the image printing apparatus 1. By the execution of the processing procedure, if the power supply is made available or if an operation of the touch panel 12 by the user is detected in a standby state of the image printing apparatus 1, the control section 11 controls the image display section 4 to display an initial menu screen. Further, in response to a predetermined operation on the initial menu screen, the control section 11 changes over the action of the image printing apparatus 1 to a maintenance mode and controls action of the scanner 5 to acquire an image of a template and register an image of the acquired template into the template database 16A.

Figure 5:
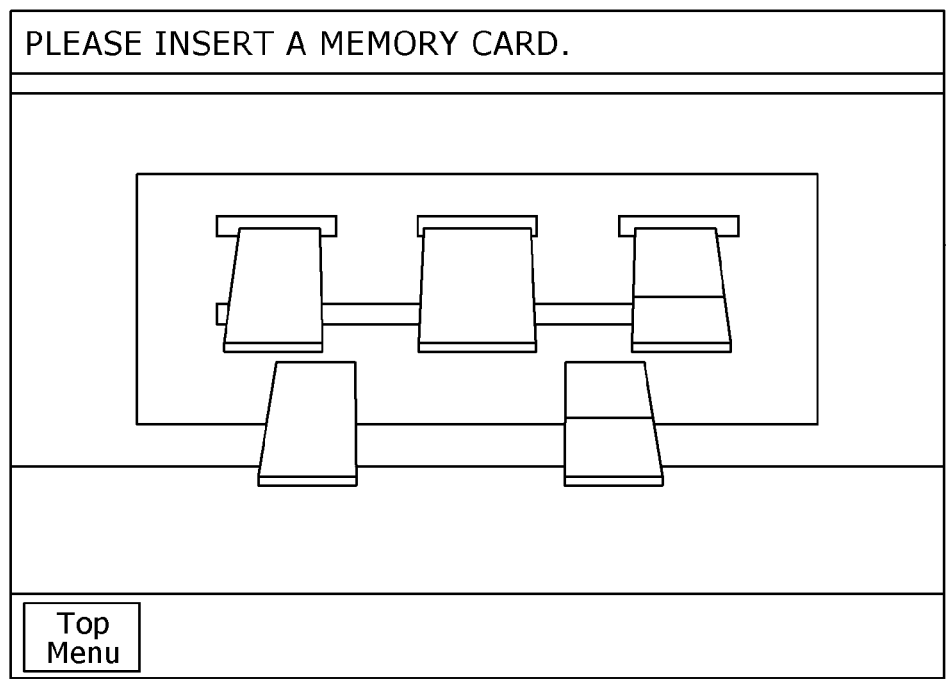
FIG. 5 is a plan view showing a guidance screen of the image printing apparatus of FIG. 2.

On the other hand, if a menu of photograph printing is selected on the initial menu screen, then the control section 11 changes over the display of the image display section 4 so that a guidance for urging the user to insert a recoding medium into one of the inlet ports 3 is displayed as seen in FIG. 5. It is to be noted that, on the display screen of the guidance, a message for urging the user to perform an operation is displayed on the highest stage, and an image representative of a relationship between the inlet ports 3 and corresponding recording media is displayed below the message. On the lowest stage, a menu "Top Menu" for returning to the initial menu screen is displayed.

Figure 6:
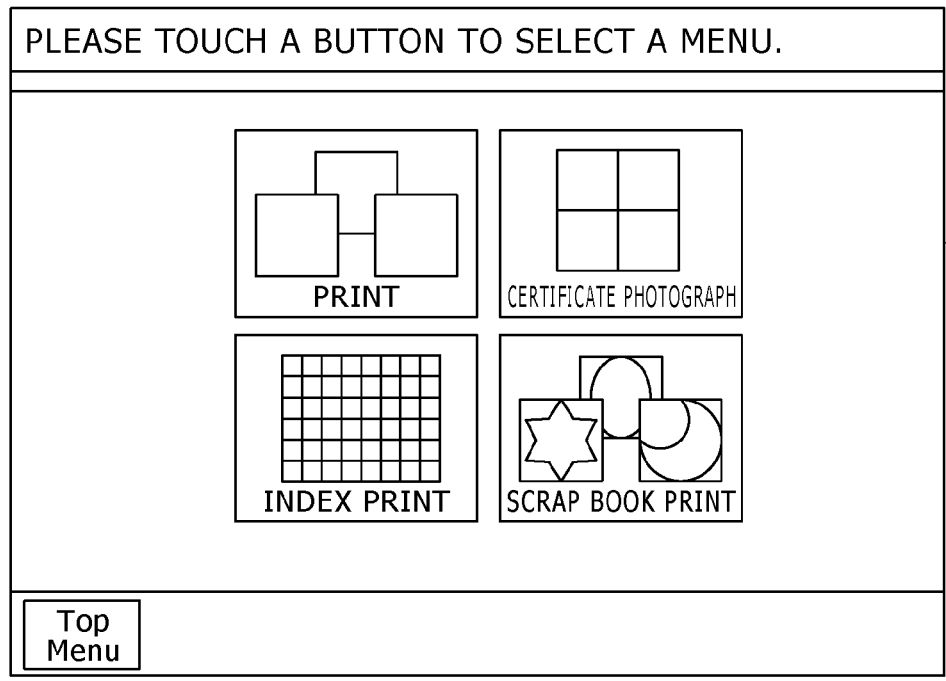
FIG. 6 is a plan view showing a process selection screen of the image printing apparatus of FIG. 2.

If, in this state, the user inserts a recording medium into a corresponding one of the inlet ports 3, then the control section 11 changes over the display of the image display section 4 to a selection screen of a process shown in FIG. 6. It is to be noted that, if the user inserts a recording medium into a corresponding one of the inlet ports 3 directly without operating the touch panel 12 on the initial menu screen, then the control section 11 omits display of the guidance screen of FIG. 5 but changes over the display of the image display section 4 directly to the selection screen of a program shown in FIG. 6.

Referring to FIG. 6, on the selection screen of a process, a message for urging the user to perform an operation is displayed on the highest stage. Below the message, menus of "Print", "Certificate photograph", "Index print" and "Scrap book print" are displayed, and on the lowest stage, a menu "Top Menu" for returning to the initial menu screen is displayed. Here, the menu "Print" is a menu for indicating printing of an image recorded on the recording medium. Meanwhile, the menu of "Certificate photograph" is a menu which indicates printing of a photograph for certification, and the menu "Index print" is a menu for indicating solid printing to be used for indexing. In contrast, the menu "Scrap book print" is a menu for selecting a process relating to a scrap book.

The control section 11 changes over the display of the image display section 4 in response to selection of one of the menus displayed on the selection screen and accepts an input by the user and then executes a series of processes relating to the selected menu. In the process, if the user selects the menu "Scrap book print", then the control section 11 changes over the display of the image display section 4 so that an image selection screen shown in FIG. 7 is displayed.

Figure 7:
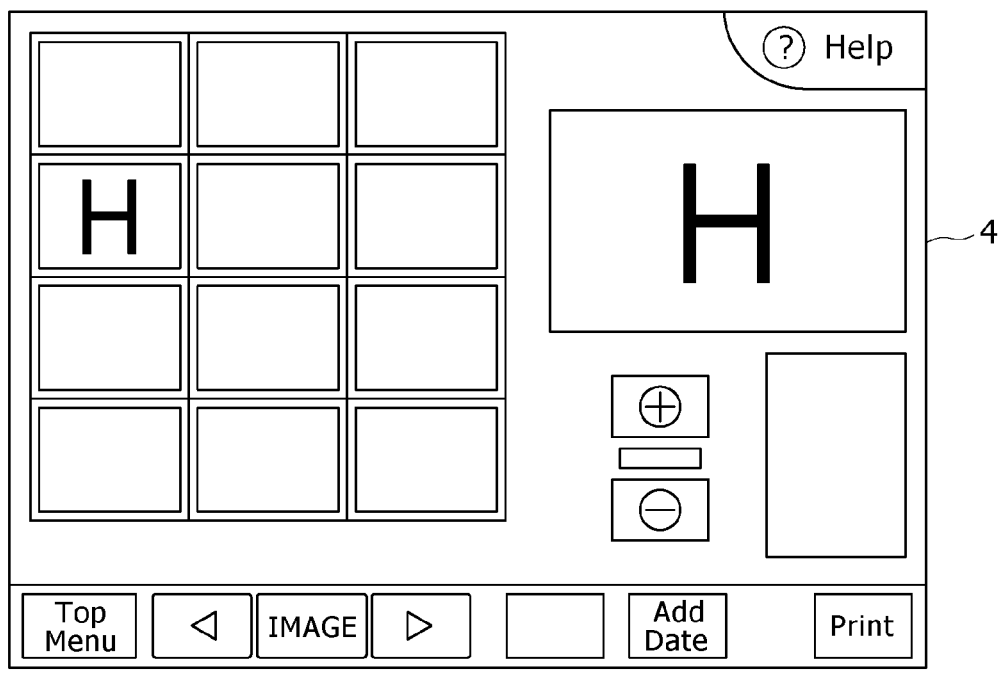
FIG. 7 is a plan view showing a table display of thumbnail images on the image printing apparatus of FIG. 2.

Referring to FIG. 7, on the image selection screen, thumbnail images of images recorded on the recording medium are displayed in a table. Further, various menus and so forth are displayed along the lower edge of the image selection screen. In particular, a menu "Top Menu" for returning to the top menu screen, a menu for indicating changeover of a preview image, a menu "Add Date" for indicating printing with a data added, and a menu "Print" for indicating printing are displayed. Further, on a right side portion of the image selection screen, a "Help" menu for directing display of a help screen, a preview image expanded from one of the thumbnail images, menus "+" and "−" for increasing and decreasing the number of prints, respectively, and so forth are displayed in order from above.

The control section 11 accepts various settings relating to an image displayed as the preview image in response to an operation of the menu and executes a printing process based on the settings. If selection of a display of a thumbnail image is detected in the series of processes described above, then the control section 11 changes over the display of the image display section 4 to a display of an editing screen relating to the selected thumbnail image.

Figure 8:
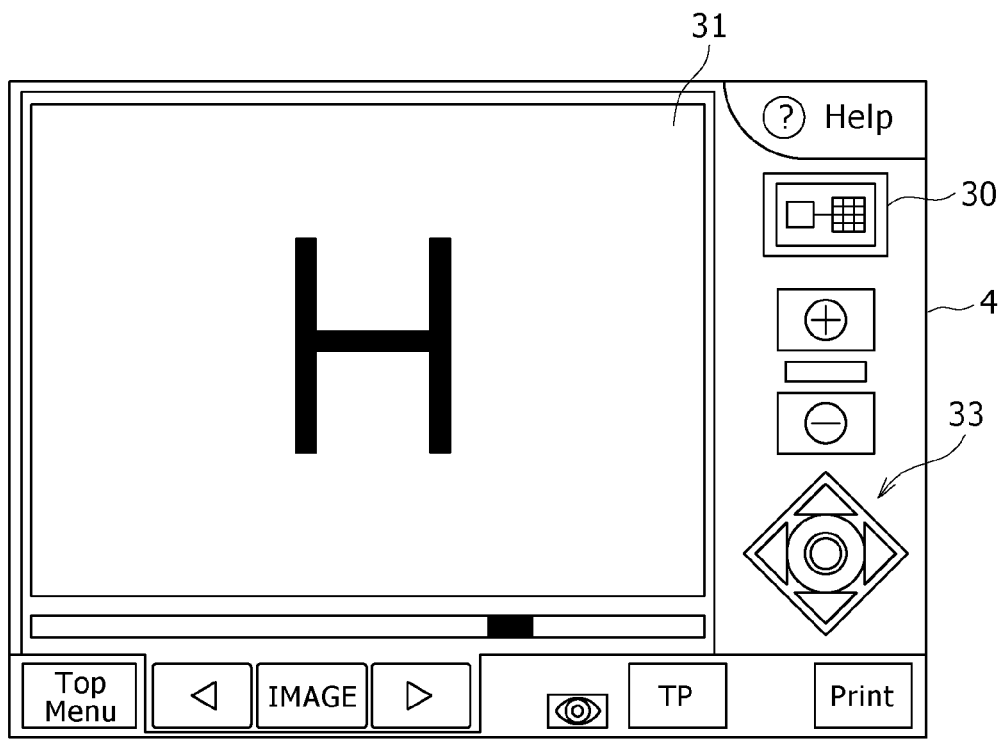
FIG. 8 is a plan view showing a preview screen of the image printing apparatus of FIG. 2.

The editing screen is shown in FIG. 8. Referring to FIG. 8, in the display screen shown, an expanded image 31 expanded from a thumbnail image selected by the user is displayed. Further, along the lower end of the editing screen, a menu "Top Menu" for returning to the top menu screen, a menu for indicating changeover of the expanded image 31, a menu "TP" for indicating display of templates in a table, and a menu "Print" for indicating printing are displayed.

Further, along the right side end of the editing screen, a menu "Help" for indicating displaying of a help screen, a return menu 30 for indicating changeover of the display back to the image selection screen, and menus "+" and "−" for increasing and decreasing the number of prints, respectively, are displayed. Also a menu 33 for an operation relating to a template is displayed. Consequently, the control section 11 accepts various settings relating to the expanded image 31 in response to an operation of the menu. At this time, if the menu "Template" for indicating table display of templates is selected, then the control section 11 changes over the display of the image display section 4 to table display of templates recorded in the template database 16A as seen in FIG. 9.

Figure 9:
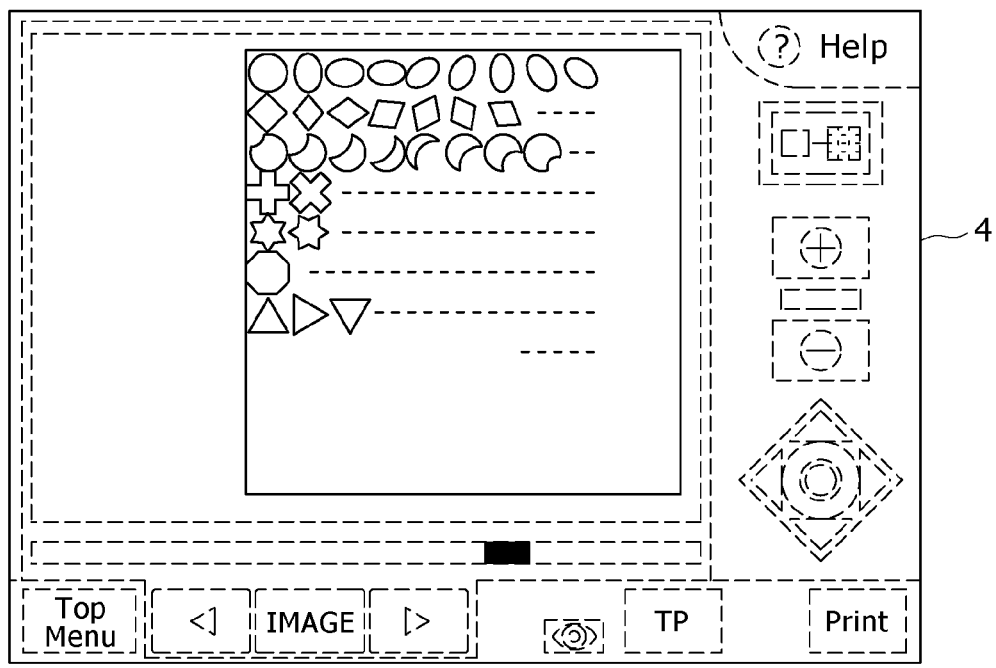
FIG. 9 is a plan view showing a table display of templates of the image printing apparatus of FIG. 2.
Figure 10:
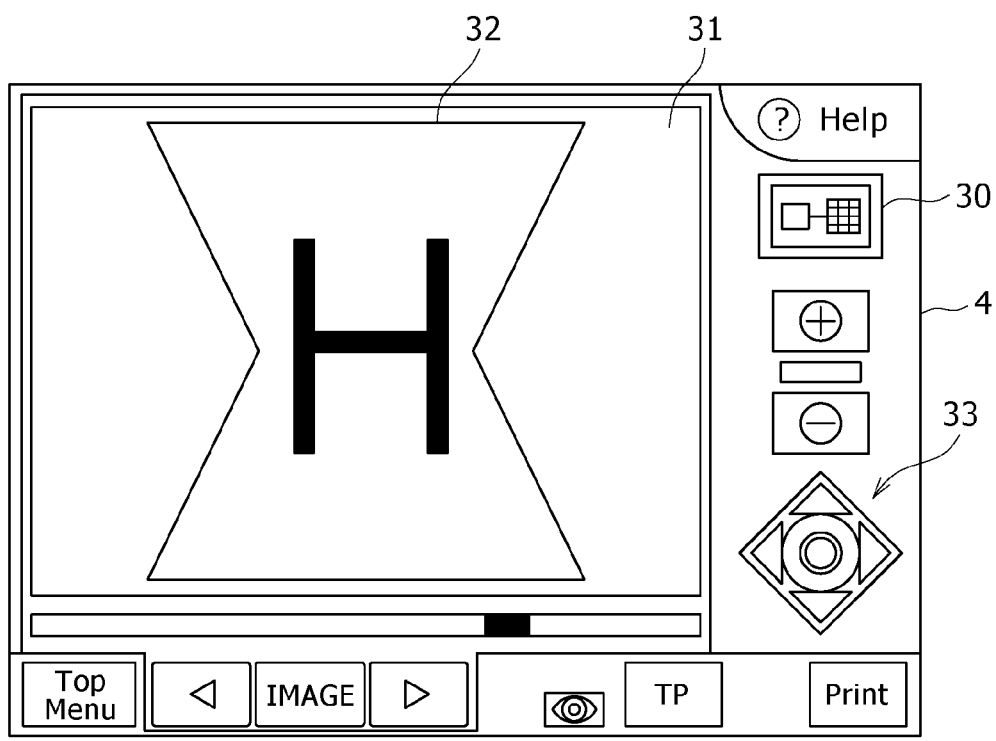
FIG. 10 is a plan view showing a display of a template and an image on the image printing apparatus of FIG. 2.

Referring to FIG. 9, in the table display of templates shown, templates of various shapes recorded in the template database 16A are successively disposed and displayed. If the user selects one of the templates in the table display of templates, then the control section 11 displays the template 32 selected by the user in an overlapping relationship with the expanded image 31 as seen in FIG. 10 in contrast to FIG. 8.

Figure 11:
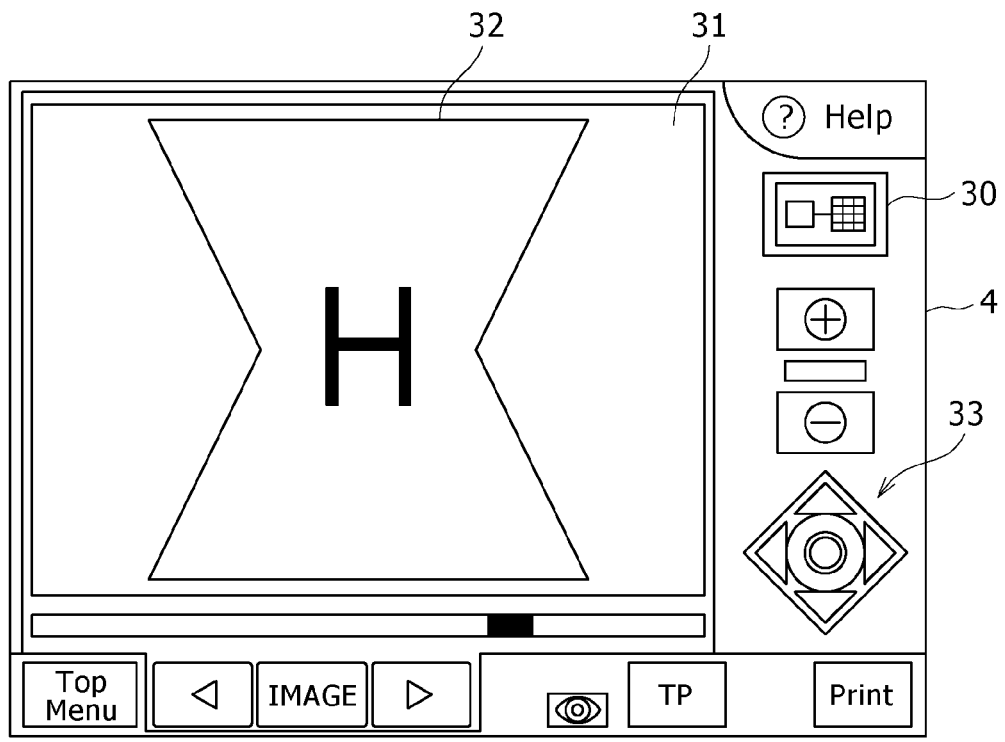
FIG. 11 is a plan view illustrating reduction of an image on the image printing apparatus of FIG. 2.
Figure 12:
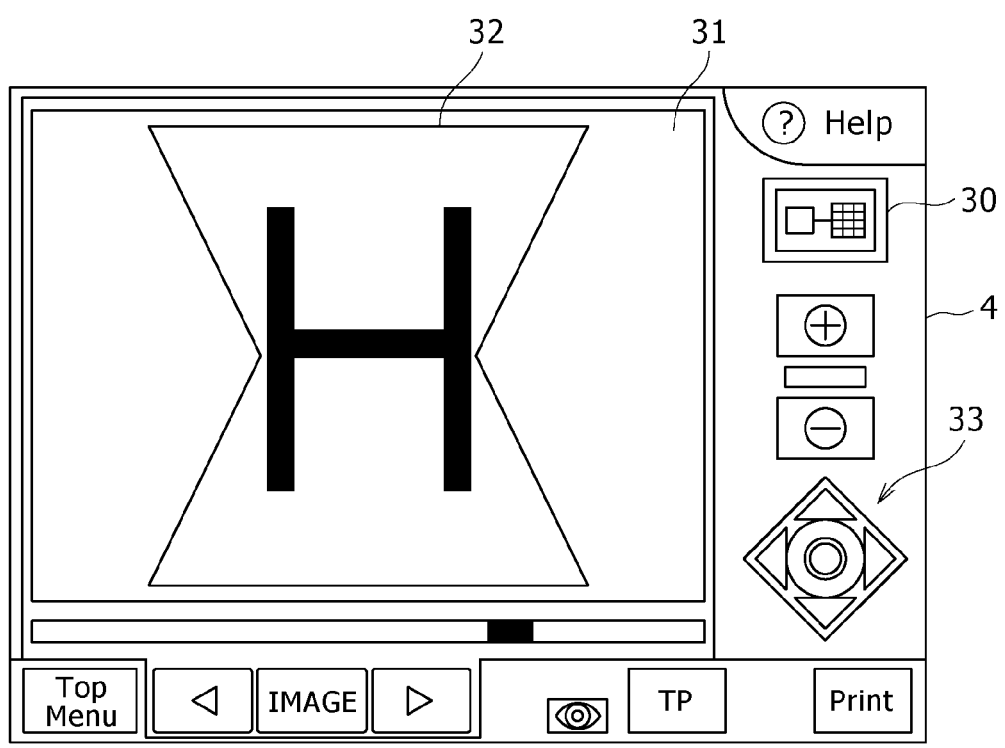
FIG. 12 is a plan view illustrating expansion of an image on the image printing apparatus of FIG. 2.

After the template 32 is displayed in an overlapping relationship on the expanded image 31 in this manner, the control section 11 accepts an operation of the menu 33 for an operation relating to a template. In the menu 33 for an operation relating to a template, a menu of a circular shape for indicating reduction of the expanded image 31 and a menu of a ring shape which surrounds the circular menu and indicates expansion of the expanded image 31 are disposed at a middle portion. The control section 11 operates in response to an operation of the menu for reduction or expansion to reduce or expand the display of the expanded image 31 as shown in FIG. 11 or 12 in contrast with FIG. 10.

Figure 13:
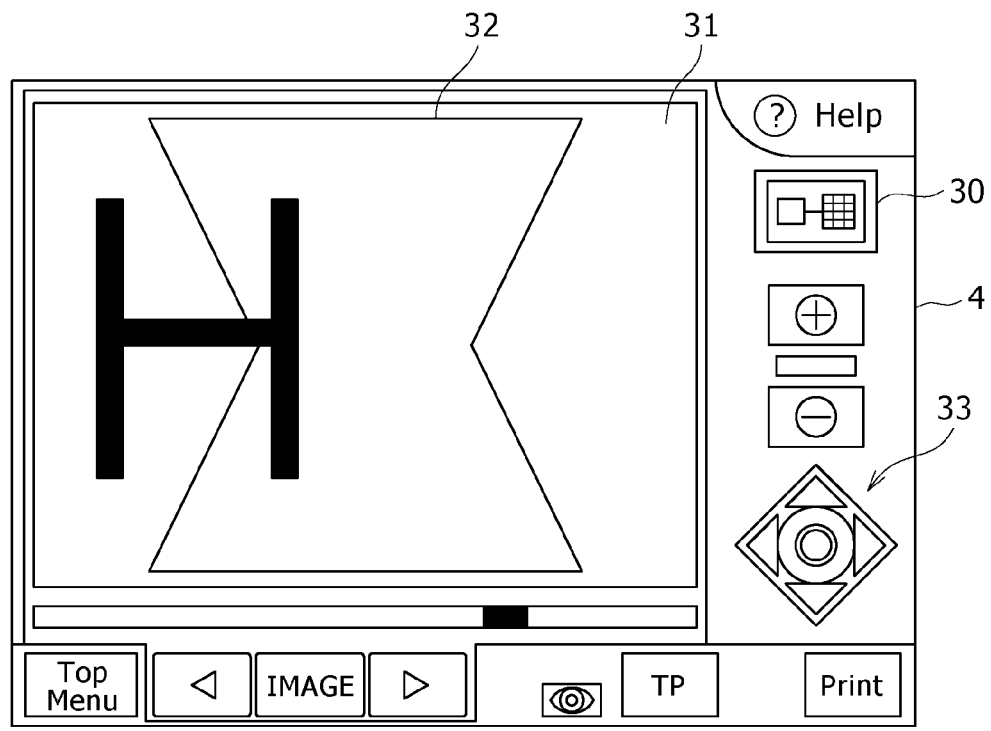
FIG. 13 is a plan view illustrating movement of an image on the image printing apparatus of FIG. 2.

Further, in the menu 33, menus of a triangular shape for indicating changing of the display position of the expanded image 31 displayed in an enlarged scale in the upward, downward, leftward or rightward direction are displayed at upper, lower, leftward and rightward positions around the ring-shaped menu. In response to an operation of one of the menus for changing the position, the control section 11 moves the display position of the expanded image 31 in a corresponding direction as seen in FIG. 13 in contrast to FIG. 12.

On the other hand, if the return menu 30 is operated, then the control section 11 settles the settings relating to the thumbnail image and restores the original image selection screen shown in FIG. 7. Consequently, the control section 11 accepts settings of a template desired by the user to the image selected by the user and further accepts changing of the relative position and the size of the image with respect to the template.

Thus, if the control section 11 accepts the settings of the template or the change of the relative position or the size of the image in this manner and restores the original image selection screen and then the user selects a thumbnail image again on the image selection screen, then the control section 11 accepts a setting of the template and/or a change of the relative position and the size of the image with regard to the selected thumbnail image and restores the original image selection screen.

Further, if the original selection screen is restored in this manner and then the user selects the menu "Print" for indicating printing, then the control section 11 prints a photograph of the thumbnail image set as the printing object. At this time, the control section 11 drives the thermal head with image data of the printing object and drives the ink jet printer header with image data of the template so that an image and a template are printed on the front face and the rear face of the paper, respectively. Further, at this time, the image is printed at the position with the size indicated by the user.

Figure 14A:
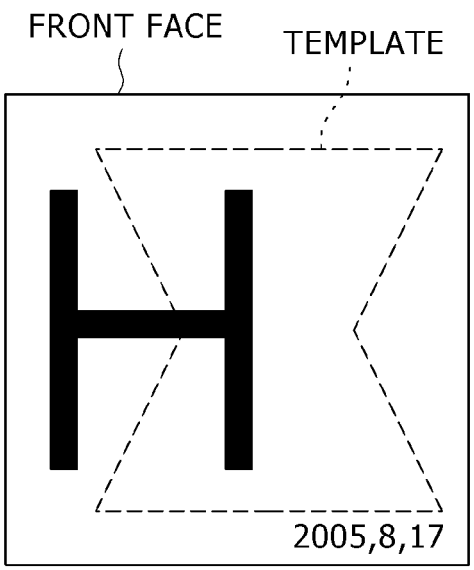
FIGS. 14A and 14B are plan views illustrating printing by the image printing apparatus of FIG. 2.
Figure 14B:
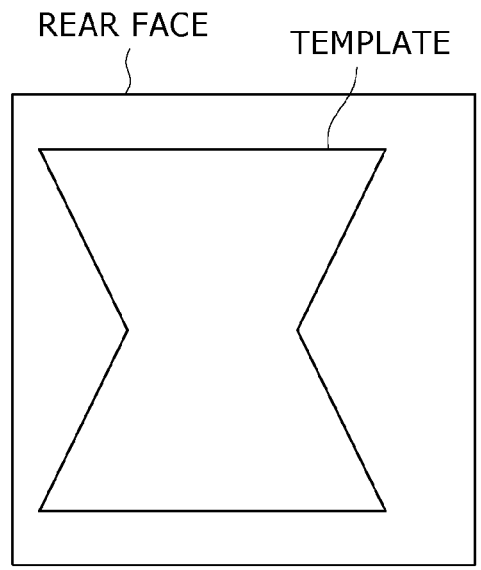

More particularly, the control section 11 controls driving of the heads for printing an image and a template so that, under the assumption that the paper is transparent, the image and the template when the results of printing are viewed from the side on which the image is printed may be displays of the expanded image 31 and the template 32 whose display position and size are set by the user as seen in FIGS. 14A and 14B. In particular, in the present embodiment, since the upward and downward direction of the results of printing is the feeding direction of the roll paper, the control section 11 controls so that the template is printed in a leftwardly and rightwardly reversed state on the printing face so that, when a result of the printing is viewed from the side on which the image is printed, it may coincide with an image obtained where the template 32 is displayed in an overlapping relationship with the expanded image 31 by the image display section 4. It is to be noted that, from this, if the leftward and rightward direction of the result of printing coincides with the feeding direction of the roll paper, then the template is printed in a vertically reversed or inverted state. Consequently, the control section 11 prints the template on the rear face of the roll paper such that, where a printed photograph is cut out in accordance with the template printed on the rear face of the roll paper, a portion surrounded by the template displayed by the image display section 4 remains accurately.

Further, the control section 11 prints information relating to the photograph at a portion to be cut out using the template. In the present embodiment, the date of printing is applied as the information. Consequently, in the present embodiment, the convenience to the user is enhanced in regard to management of the photograph in working of scrap booking.

Figure 1:
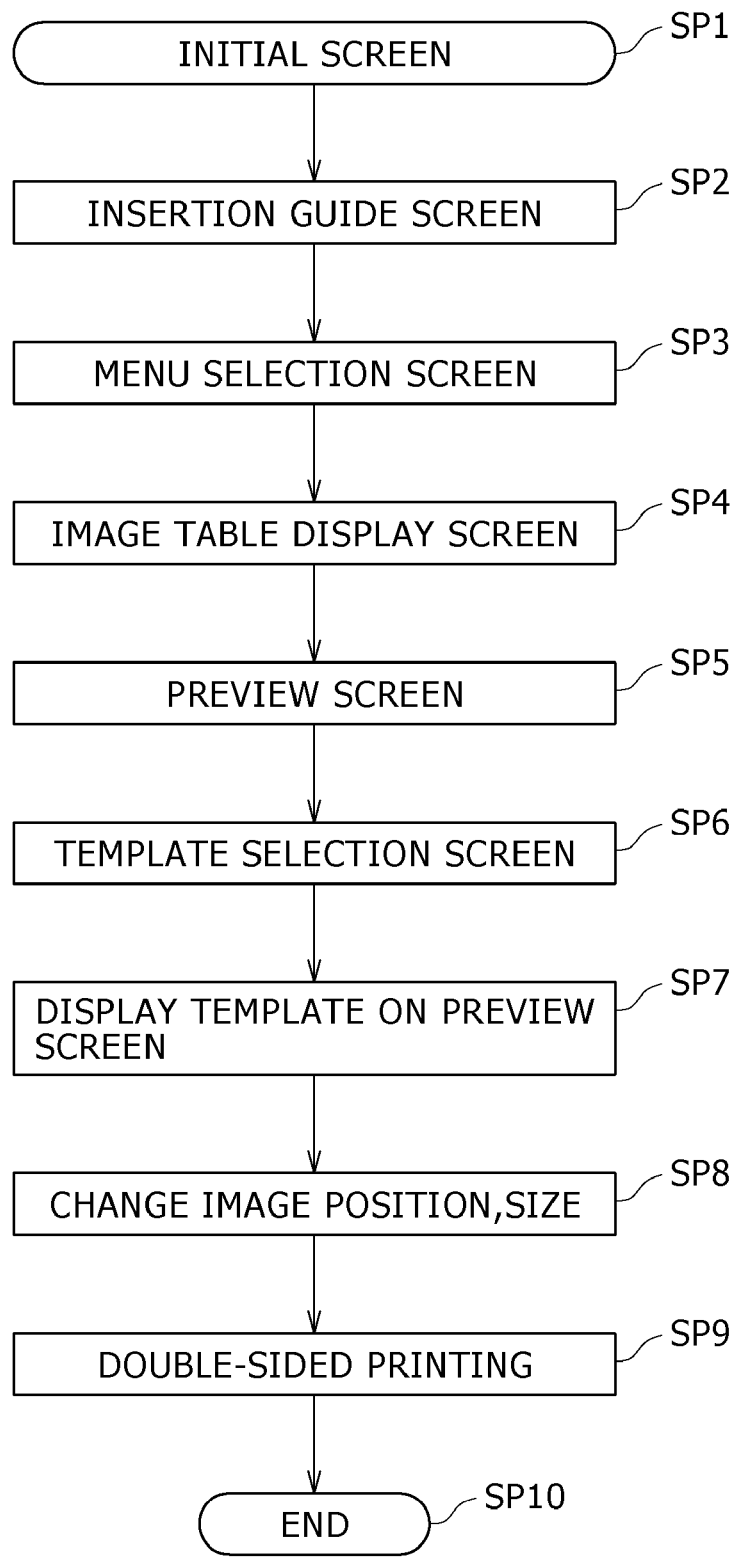
FIG. 1 is a flow chart illustrating a processing procedure of a control section of an image printing apparatus to which the present invention is applied.

Thus, the control section 11 executes a processing procedure of FIG. 1 to print a photograph as an object of scrap booking. Referring to FIG. 1, the control section 11 displays the initial menu screen at step SP1 and then displays the guidance display screen described hereinabove with reference to FIG. 5 at step SP2. Then, if a recording medium is inserted by the user, then the control section 11 displays the process selection screen described hereinabove with reference to FIG. 6 at step SP3. Then, if the menu "Scrap book print" is selected on the process selection screen, then the control section 11 displays the image selection screen by table display of thumbnail images described hereinabove with reference to FIG. 7 at step SP4.

Further, if one of the thumbnail images is selected on the image selection screen, then the processing advances to step SP5, at which the control section 11 displays the preview screen of the expanded image described hereinabove with reference to FIG. 8. On the other hand, if the table of templates described hereinabove with reference to FIG. 9 is displayed at step SP6 and then a template is selected on the table display by an operation of the user, then the control section 11 displays the template in an overlapping relationship with the expanded image as described hereinabove with reference to FIG. 10 at step SP7.

Then at step SP8, the control section 11 accepts a change of the size and the position of the expanded image in response to an operation by the user. Then, the control section 11 prints the image and the template on the opposite faces of the paper at step SP9 in response to a printing indication by the user. Thereafter, the processing advances to step SP10, at which the series of processes described above is completed.

2. Action of the Embodiment

In the image printing apparatus 1 (FIGS. 2 and 3) having the configuration described above, an image based on image data recorded on a recording medium such as a memory card is printed by the printing section 15 and presented to the user in response to a selection operation of the user displayed on the image display section 4.

In the series of processes described above, if the user selects the menu relating to scrap booking in FIG. 6, then thumbnail images of all images which are recorded on the recording medium and can be printed are displayed in a table as seen in FIG. 7. Thus, the image printing apparatus 1 accepts selection of an image to be printed, the print size and the number of prints of the selected image by setting of the user on the table display.

At this time, in response to an indication by the user, the image printing apparatus 1 displays the thumbnail image selected by the user in an expanded size as seen in FIG. 8. Further, in response to an operation of the template menu by the user, the image printing apparatus 1 displays a table of templates retained in the template database 16A as seen in FIG. 9. Further, if the user selects a template from within the table of templates, then the image printing apparatus 1 displays the template selected by the user in an overlapping relationship with the expanded image as seen in FIG. 9. Further, in response to an operation of any of the various menus displayed together with the expanded image by the user, the image printing apparatus 1 changes the position and the size of the expanded image with respect to the template as seen in FIGS. 11 to 13.

In this manner, in the image printing apparatus 1, selection of a template is accepted and the relative position of the image and the template and the size of the image are set, whereafter the image and the template are printed on the front and rear faces of the paper, respectively, in response to a printing indication by the user in such a manner as described above. Further, the image and the template are printed so that, under the assumption that the paper is transparent, the image and the template when the results of printing are viewed from the side on which the image is printed may be displays of the expanded image 31 and the template 32 whose display position and size are set by the user. Consequently, the image and the template are printed, where a printed photograph is cut out in accordance with the template printed on the rear face of the paper, a portion surrounded by the template displayed by the image display section 4 remains accurately.

Consequently, after a template of a desired shape is selected, the user can adjust the relative position between the selected template and the image of a processing object as if the position of a portion to be cut out were to be adjusted with a scale placed on a photograph. Consequently, the user can change the size of the image variously so as to balance with the size of the template while confirming the finish where the photograph is cut out in accordance with the shape of the template. As a result, in the present embodiment, disagreement in size between a scale and a photograph can be eliminated readily and with certainty.

Further, since the size of the image is adjusted in this manner and the template is printed on the rear face of the paper as a result of printing, even if a line for cutting remains when the photograph is cut out with the template, the remaining line for cutting cannot be visually observed from the front face of the paper. Consequently, deterioration of the finish by a line for cutting can be prevented.

3. Advantage of the Embodiment

In the image printing apparatus 1 having the configuration described above, a change of the relative position between the displayed image and the template and a change of the size of the image are accepted. Then, based on the settings of the image and the template, the image and the template are printed on the front face and the rear face of paper, respectively. Consequently, where the photograph is applied to scrap booking, disagreement in size between a scale and a photograph can be eliminated simply and with certainty, and otherwise possible deterioration of the finish caused by a line for cutting can be prevented.

Second Embodiment

The image printing apparatus of the second embodiment is a modification to but is different from the image printing apparatus 1 described hereinabove in that it further accepts setting of a color and a line width of a template on the display of an expanded image (FIG. 10) described hereinabove. Then, the image printing apparatus displays the template of the set color and line width in an overlapping relationship with the expanded image. Further, in response to a printing indication of the user, an outer side counter line of the template having the set line width is printed on the rear face of the paper while the template of the color and line width is printed in an overlapping relationship with an image on the front face of the paper.

Consequently, in the present embodiment, if a photograph is cut out along a template having a contour line and printed on the rear face of the paper, then the photograph of the shape of the template can be obtained in a form wherein it is bordered with the line width. Consequently, the cut photograph can be decorated to enhance the finish of the scrap book. Further, in this instance, a mat to which the photograph is to be adhered can be omitted, and the time required for the production of the scrap book can be reduced as much while the pleasure in manual operation remains.

With the image printing apparatus of the present second embodiment, since an input of a color and a line width is accepted and a template is printed also on the front face of the paper, the finish of the scrap book is enhanced furthermore and an advantage similar to that of the first embodiment can be anticipated.

Third Embodiment

The image printing apparatus of the third embodiment is a modification to but is different from the image printing apparatus 1 of the first described hereinabove in that it accepts a position and expansion/reduction of a template in place of or in addition to a change of a position and expansion/reduction of an image on the display of an expanded image shown in FIG. 10. Then, the image printing apparatus prints the image and the template set in this manner on the front and rear faces of the paper, respectively.

Consequently, in the image printing apparatus of the third embodiment, it is possible not only to adjust the size of an image to the size of a template but also to adjust the size of a template to the size of an image or vary both of the sizes of the template and the image to cut out a photograph in a desired size. Consequently, disagreement in size between a scale and a photograph can be eliminated with a high degree of certainty when compared with the image printing apparatus 1 of the first embodiment.

With the image printing apparatus of the present third embodiment, disagreement in size between a scale and a photograph can be eliminated with a higher degree of certainty than with the image printing apparatus of the first and second embodiments.

Fourth Embodiment

It is to be noted that, while, in the embodiments described above, a series of processes is executed using a template registered in advance, according to the present invention, handling of a template is not limited to this, but a template may be acquired separately through an input by the user. It is to be noted that, in this instance, an input of a template may be accepted through a dragging process by the user on a touch panel.

Further, in the embodiments described hereinabove, images selected by each user are printed one by one. However, according to the present invention, printing is not limited to this, but the present invention can be applied also where a plurality of images selected by the user are printed continuously or successively on a single paper sheet by multi printing.

Further, in the embodiments described hereinabove, a template same as a template printed on the rear face of the paper is printed on the front face of the paper. However, according to the present invention, the printing of a template is not limited to this, but a plurality of templates may be printed on the front face side while a space between the templates is printed in color so that the decoration may be further promoted.

Further, in the embodiments described hereinabove, an image provided by a user is printed on various recording media by an image printing apparatus installed in a shop. However, according to the present invention, printing of an image is not limited to this. For example, the present invention can be applied widely to various cases such as a case wherein an image provided through a network is to be printed and another case wherein an image acquired directly from an image pickup apparatus such as an electronic still camera connected to the image printing apparatus through an interface such as a USB (Universal Serial Bus) interface is printed.

Further, in the embodiments described hereinabove, the present invention is applied to an apparatus for exclusive use for printing a photograph. However, the application of the present invention is not limited to this, but the present invention can be applied widely to various cases. For example, the present invention can be applied to a program for printing and/or image editing which can be executed by a computer, to an application for a printer connected to and used together with a computer or the like and to printing of a photograph. It is to be noted that, as the printing section in this instance, for example, printers which allow double-sided printing of various types such as a type wherein print paper is reversed intermediately by a reversing mechanism so as to be moved back and forth repetitively in front of a printer head can be applied widely.

While preferred embodiments of the present invention have been described using specific terms, such description is for illustrative purpose only, and it is to be understood that changes and variations may be made without departing from the spirit or scope of the following claims.

What is claimed is:

1. An image printing apparatus for printing an image to be used for scrap booking, comprising:
    an image data acquisition section configured to acquire image data of a processing object image;
    a template retaining section configured to retain a plurality of templates each indicating a contour line of a cutout shape in which the image for the scrap booking is to be cut out;
    a template selection section configured to select at least one of the templates retained by said retaining section;

an image display section configured to display an image based on the image data acquired by the image data acquisition step and the template selected by said template selection section such that the template is imposed on the image;

an operation section configured to be operated by a user to change the relative positions of the image and the template displayed on said image display section and change the size of at least one of the image and the template displayed on said image display section; and a printing section configured to print the image and the template on the front and rear faces of a sheet of paper, respectively, such that, when the paper is viewed from the front face on which the image is printed, under the assumption that the paper is transparent, the printed image and the template may coincide as do the displayed changed image and template.

2. The image printing apparatus according to claim 1, wherein said operation section further accepts at least one of a change of the color and a change of the line width of the template, and said printing section prints the template of the color and the line width accepted by said operation section in an overlapping relationship with the image on the front face of the paper.

3. An image printing method for printing an image to be used for scrap booking, comprising the steps of:

acquiring image data of a processing object image;

selecting the at least one template, from a template retaining section which retains a plurality of templates each of which indicates a contour line of a cutout shape in which the image for the scrap booking is to be cut out;

displaying an image based on the image data acquired by the image data acquisition step and the template selected by the template selection step such that the template is imposed on the image;

changing the relative positions of the image and the template displayed in the image display step and changing the size of at least one of the image and the template displayed by the image display step; and printing the image and the template on the front and rear faces of paper, respectively, such that, when the paper is viewed from the front face on which the image is printed, under the assumption that the paper is transparent, the image and the template may coincide as do the changed image and template.

4. A program for an image printing method for printing an image to be used for scrap booking by execution of an arithmetic operation processing section, comprising the following steps implemented on an information processing device and a printer in communication therewith:

acquiring image data of a processing object image;

selecting at least one template from a template retaining section which retains a plurality of templates, each template indicating a contour line of a cutout shape in which the image for the scrap booking is to be cut out;

displaying an image based on the image data acquired in the image data acquisition step and the template selected in the template selection step such that the template is disposed on the image;

accommodating a change of the relative positions of the image and the template displayed in the image display step and a change of the size of at least one of the image and the template displayed in the image display step by means of user input; and printing the image and the template on the front and rear faces of a sheet of paper, respectively, such that, when the paper is viewed from the front face on which the image is printed, under the assumption that the paper is transparent, the printed image and the template may coincide as do the displayed changed image and template.

5. A recording medium on which a program for an image printing method for printing an image to be used for scrap booking by execution of an arithmetic operation processing section is recorded, the program for an image printing method comprising the steps of:

acquiring image data of a processing object image;

selecting at least one template, from a template retaining section which retains a plurality of templates each of which indicates a contour line of a cutout shape in which the image for the scrap booking is to be cut out, at least one of the templates;

displaying an image based on the image data acquired by the image data acquisition step and the selected template such that the template is imposed on the image;

accepting a user input to change the relative position of the displayed image and the template and change the size of at least one of the displayed image and the template; and printing the image and the template on the front and rear faces a sheet of paper, respectively, such that, where the paper is viewed from the front face side on which the image is printed, under the assumption that the paper is transparent, the image and the template may coincide as they do in the display of the changed image and template.

* * * * *